United States Patent
Luo et al.

(10) Patent No.: US 6,216,158 B1
(45) Date of Patent: Apr. 10, 2001

(54) SYSTEM AND METHOD USING A PALM SIZED COMPUTER TO CONTROL NETWORK DEVICES

(75) Inventors: Wenjun Luo, Fremont; Elaine P. Lusher, Pleasanton, both of CA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/237,609

(22) Filed: Jan. 25, 1999

(51) Int. Cl.[7] .................................................... G06F 13/00
(52) U.S. Cl. ......................... 709/217; 709/219; 709/225; 709/313; 709/329
(58) Field of Search .................................... 709/202, 203, 709/217, 219, 223, 225, 230, 250, 313, 319, 328, 329

(56) References Cited

U.S. PATENT DOCUMENTS

| | | | |
|---|---|---|---|
| 5,564,070 | * 10/1996 | Want et al. ............................ | 455/507 |
| 5,790,977 | *  8/1998 | Ezekiel ................................. | 702/122 |
| 5,832,506 | * 11/1998 | Kuzma ................................. | 707/200 |
| 5,909,545 | *  6/1999 | Frese II et al. ....................... | 709/208 |
| 5,923,885 | *  7/1999 | Johnson et al. ....................... | 395/712 |
| 5,964,836 | * 10/1999 | Rowe et al. .......................... | 709/221 |
| 5,973,696 | * 10/1999 | Agranat et al. ....................... | 345/357 |

OTHER PUBLICATIONS

M.G. Lamming, *Institute for Personalized Information Environment 1994* "Towards Future Personalised Information Environments" *Technical Report EPC—1994—104*, Dec. 21, 1993.

McCandless, Michael, "The PalmPiolt and the Handhled Revolution", IEEE Expert, Nov./Dec. 1997, pp. 6–8.

* cited by examiner

*Primary Examiner*—Viet D. Vu
(74) *Attorney, Agent, or Firm*—Mark A. Haynes; Haynes & Beffel LLP (57) ABSTRACT

Controlling network services using palm sized computers is described. A program on the palm sized computer is used to access a registry of network services that may be available. The registry includes descriptions for various services. Each description includes at least a reference to program code that can be downloaded to the palm sized computer. Executing this program causes the palm sized computer to issue commands directly to the specific network services needed. In some cases, these network services include application services for running desktop applications that the palm sized computer could not execute.

20 Claims, 7 Drawing Sheets

SYSTEM AND METHOD USING A PALM SIZED COMPUTER TO CONTROL NETWORK DEVICES

BACKGROUND OF THE INVENTION

1. Field of the Invention

This invention relates to the field of networked computer. In particular, the invention relates to a system and method to control network devices using a palm sized, or otherwise reduced functionality, computer.

2. Description of the Related Art

Palm sized computers, also referred to as Personal Digital Assistants (PDAs), are portable devices which perform an array of personal management tasks such as calendar management and address book storage. The adoption of palm sized computers has been rapid. Some palm sized computers are able to interface with conventional computing devices, such as PCs, on an as-needed basis. For example, palm sized computers such as 3Com's Palm Platform™ computers can upload personal appointments to a PC-based calendar.

Palm sized computers generally have the following characteristics. Relative to desktop and laptop computers, palm sized computers have limited processing, display and input capabilities. As a result of these limitations, palm sized computers do not run the same applications as desktop or laptop computers. Other limitations of palm sized computers include limited battery life and lower bandwidth communications with other devices.

One big advantage of palm sized computers is their portability. Therefore, it is desirable to be able to access desktop functionality from palm sized computers.

SUMMARY OF THE INVENTION

Controlling network services using palm sized computers is described. A program on the palm sized computer is used to access a registry of network services that may be available. The registry includes descriptions for various services. Each description includes at least a reference to program code that can be downloaded to the palm sized computer. Executing this program causes the palm sized computer to issue commands directly to the specific network services needed. In some cases, these network services include application services for running desktop applications that the palm sized computer could not execute.

In some embodiments, the device executing the network services and the palm sized computer are executing middleware applications for communicating with the registry. In some embodiments, this middleware includes Jini technology from Sun Microsystems. Additionally, the programs downloaded can include Java program code.

DETAILED DESCRIPTION

A. System Overview

A palm sized computer can serve as a network portal to usher in a new generation of mobile computing. Palm sized computers are the ideal next generation computing device in that they are inherently mobile and have the lightweight form factor necessary for mobile computing. The fundamental obstacle to palm sized computers as the next generation computing device can be removed by viewing the network as an extension of the palm sized computer's resources. Functions can be downloaded into the device as needed, and overlaid after they have been used. This allows the palm sized computer to adapt to a changing environment (as the mobile user's location changes) and to access exactly the set of services it needs. These services are stored on the network and can be used at will. Many of these services may never reside on the device and are more suitable for execution by a conventional computer. However, they are accessible and can be controlled via a lightweight computing device, such as a palm sized computer.

B. Building Blocks of Network-Enabled Palm Sized Computers

The building blocks for lightweight mobile computing include a palm sized computer, a compute/memory/storage-intensive device(s), and a network.

Middleware allows palm sized computers to discover network-based computing resources. Once discovered, this middleware provides a mechanism for the palm sized computer to use these resources. This middleware typically includes a directory of resources (or services), a protocol for storing and retrieving from the directory, and mechanisms to transfer software from the directory to a palm sized computer.

Control applications reside on a lightweight computing device, such as a palm sized computer, but manipulate computing services on the network. Control applications assume the use of middleware, such as Sun Microsystems Jini, for access to network-based resources. (Note in some embodiments, the control application is distributed between the palm sized computer and a control proxy server.)

Example Registry and Control Infrastructure: Jini

Jini™ is a technology developed by Sun Microsystems which addresses the problem of computing and network complexity. It eases the burden of accessing services by providing seamless access and automatic registration of network resources. Jini accomplishes this by adopting a model in which devices announce their presence and capabilities to the network, and access the same type of information in order to locate services they wish to use.

The Jini approach relies on Java and a Jini "registry" (i.e. database of services) as the underlying infrastructure. Each device is expected to run a Java Virtual Machine (JVM), or rely on a Jini proxy which runs a JVM on the device's behalf. Key to Java is the idea that software (as well as data) can be dynamically downloaded to a device. The Java model assumes a distributed, network-centric model in which the behavior of a device can be dynamically altered to accommodate changing conditions.

Jini eases network connectivity problems. Jini acts as middleware to access network resources, as it lets devices locate services and download software for those services. Other middleware could be substituted for Jini if it provides discovery and software download for network-based services.

C. Definitions

A control device is a device which runs Jini (or some other discovery and software download technology) and is capable of accessing a wide range of network-centric services, including services which are incapable of running on the control device. The control device is the access device for a wide class of computing services otherwise inaccessible to devices with restricted computing power. 3Com's palm sized computer, the Palm Computing platform, is an example of such a control device. Windows CE compatible devices may also be used.

A control application is as an application that relies on resources located off of the control device (e.g. on a network), but uses a control device to initiate and control the application. The resources are accessed and controlled, but not resident, on the control device. Examples of such compute/memory-intensive services include PowerPoint slide presentations and speech recognition systems. These services can be both invoked and controlled via a control device.

Network-based services can be used by any control device. Services offer a discrete task to the control device. This contrasts with a traditional model in which devices, such as a PC, house the entirety of resources a control device might utilize. Services are fine-grained and represent a distributed set of capabilities residing on a network. Services may or may not be co-located with other services on the same physical device. Services are offered (via a network and a Directory of Services, such as the Jini Lookup) in as small a unit as is justifiable given the application tasks users will typically want to accomplish. Fine-grained services can be used by a variety of consumers who need precisely that function. The model that emerges is a network-based model that offers a wide range of narrowly-defined computing services of interest to a wide range of applications. Services will be physically distributed across devices but accessible via a central repository (e.g. database) of services. This model of distributed computing is inherently scalable in that the set of services offered via the network grows seamlessly as devices "plug in" and announce their capabilities.

D. An Example of the Control Application

Figure 1:
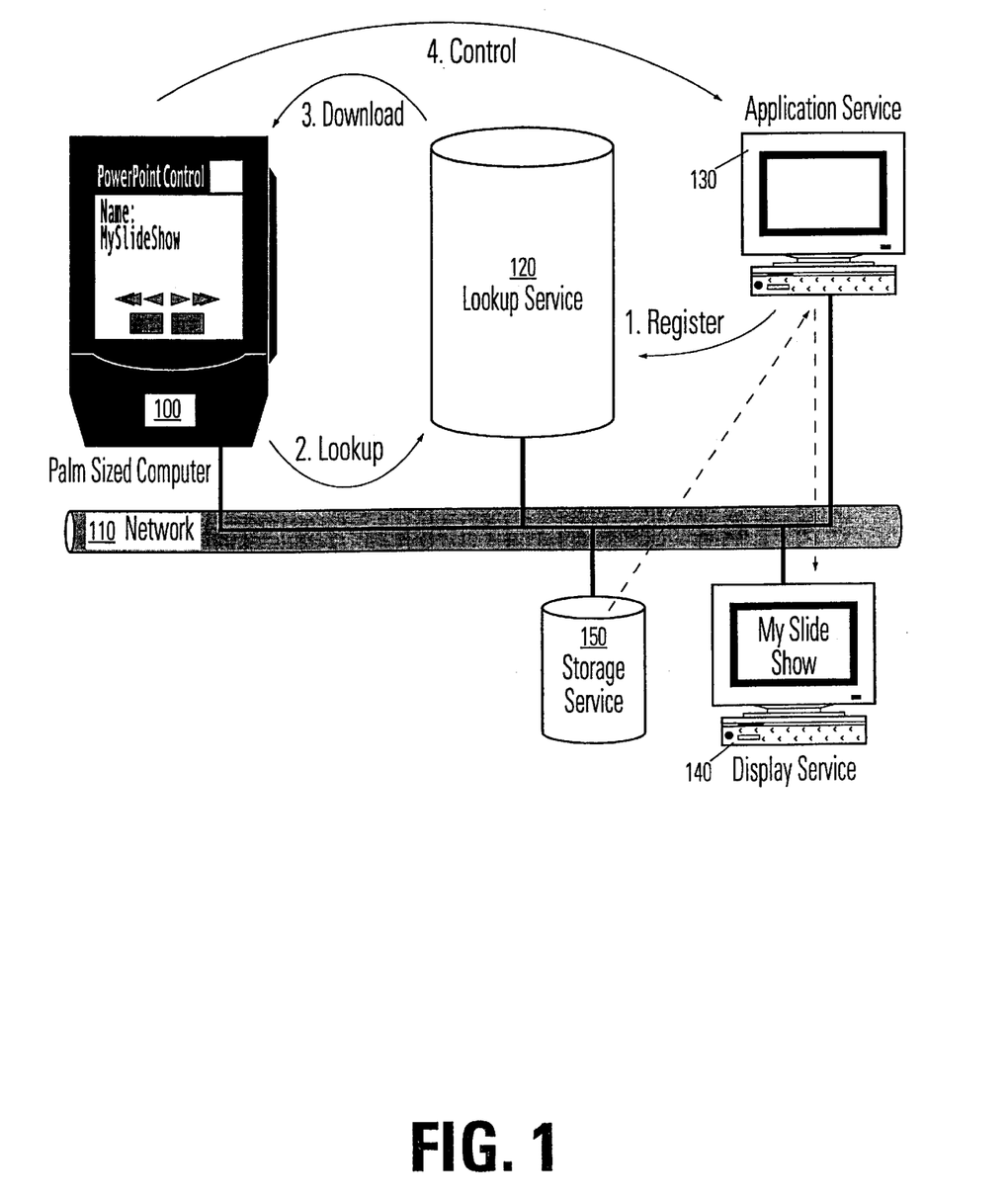
FIG. 1 illustrates a system having a palm sized computer controlling operations of various network devices.

To help illustrate the use of a control device and a control application, a PowerPoint slide presentation control is described herein. (FIG. 1 illustrates a generalized view of such an example.) In this example, a palm sized computer 100 accesses network 110 resources (via a Directory of Services, such as the lookup service 120) to locate the elements it requires to remotely control a presentation located on the network. The palm sized computer 100 uses three services to function as a control device to display a PowerPoint presentation:

an application service 130 (to run PowerPoint)

a persistent storage service 150 (to store the presentation)

a display service 140 (to display the presentation images)

Each of these services will have registered with the lookup service 100. A service in this example, is tied to different hardware devices. However, this is not required. Storage, processing, and/or display could be supported by one or more computer systems.

None of these services are resident on the palm sized computer 100. Once the palm sized computer 100 has located the necessary services, it downloads the code required to control those services (using the lookup and download protocols). Middleware, such as Sun's Java/Jini technology, is used to move the code.

The palm sized computer 100 is then capable of directly controlling the services it requires.

In this example, all the devices can communicate on the network 110, however, they need not all be connected to the network in the same way.

Functionally, the devices play the following roles:

palm sized computer 100: the remote control device application services: a set of resources and services, such as compute power and applications network 110: the physical medium which connects devices and services lookup service 120: a database of network services

E. Architecture

As noted above, the palm sized computer 100 functions as the remote control device for the PowerPoint presentation. It is a multi-function control device in that it can control a host of resources accessible via the network. The palm sized computer 100 accomplishes this via middleware (e.g. Jini) and a generic control protocol capable of issuing control commands to an offboard resource. The palm sized computer 100 implements this control via the software components depicted in FIG. 2. These software components represent a generic architecture for control of any network-based resource using a reduced functionality computer such as a palm sized computer. The software architecture, middleware, and control protocol implement a new model for lightweight mobile computing. This model of lightweight mobile computing is particularly well-served by devices such as a palm sized computer, as they possess the requisite size and portability.

Figure 2:
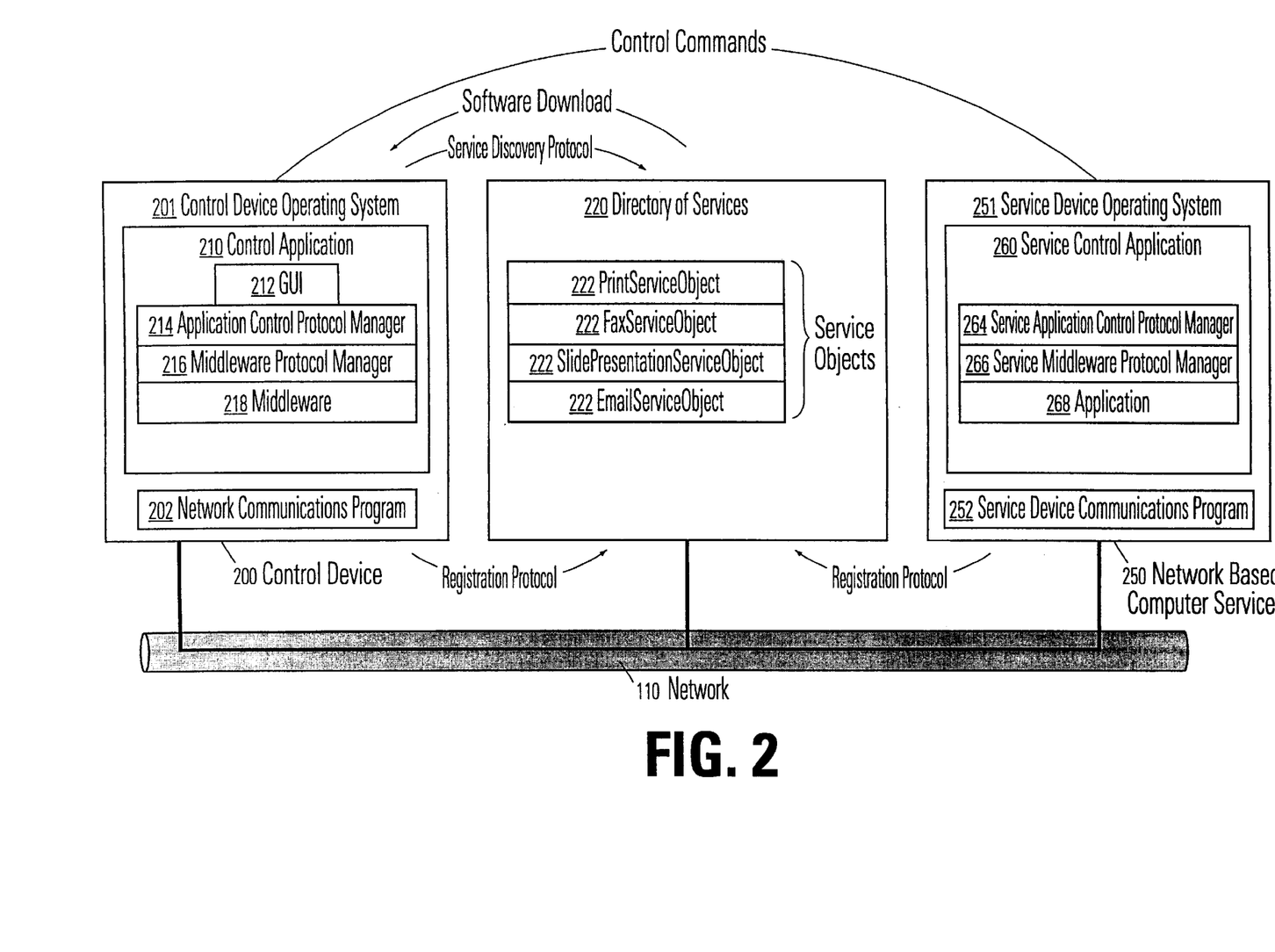
FIG. 2 illustrates a software architecture for use in the system of FIG. 1.

In FIG. 2, the control device 200 is able to control services on the network 110, such as the network based service 250. The directory of services 220 provides the registry functions used to enable the system.

The control device 200 includes a control device operating system 201 which supports a network communications program 202 and a control application 210. The network communications program 202 allows the control device 200 to communicate with other devices on the network. The control application 210 includes the following elements:

a GUI 212 to display the available network-based services and accept user input an application control protocol manager 214 which interfaces between the control device 200 and the network based computer service 250 by requesting tasks from that service (e.g. slide manipulation). This module is responsible for generating the application control protocol to command the selected service, a middleware protocol manager 216 to transfer data between the control device 200 and the directory of services 220 (e.g. communication between Palm platform and the Jini Lookup). This module is responsible for generating the syntax necessary to communicate based on the type of middleware being used.

The service device operating system 251 includes a service device communications program 252 and a service control application 260. The service device communications program 252 is responsible for communicating with the network 110. The service control application 260 includes the following components:

a service application control protocol manager 262 that interfaces between the network based computer service 250 and the control device 200 and accepts control tasks (e.g. slide manipulation) issued from the control device 200. This module is capable of sending back a response (e.g. status) to the control device 200, a middleware protocol manager 266 to transfer data between the network based computer service 250 and the directory service (e.g. communication between the application service 130 and the Jini Lookup). This module is responsible for generating the syntax used to communicate based on the type of middleware being used.

an application 268 to perform functions on the network. The application 268 can be a desktop application that would not execute on a palm sized computer.

Figure 3:
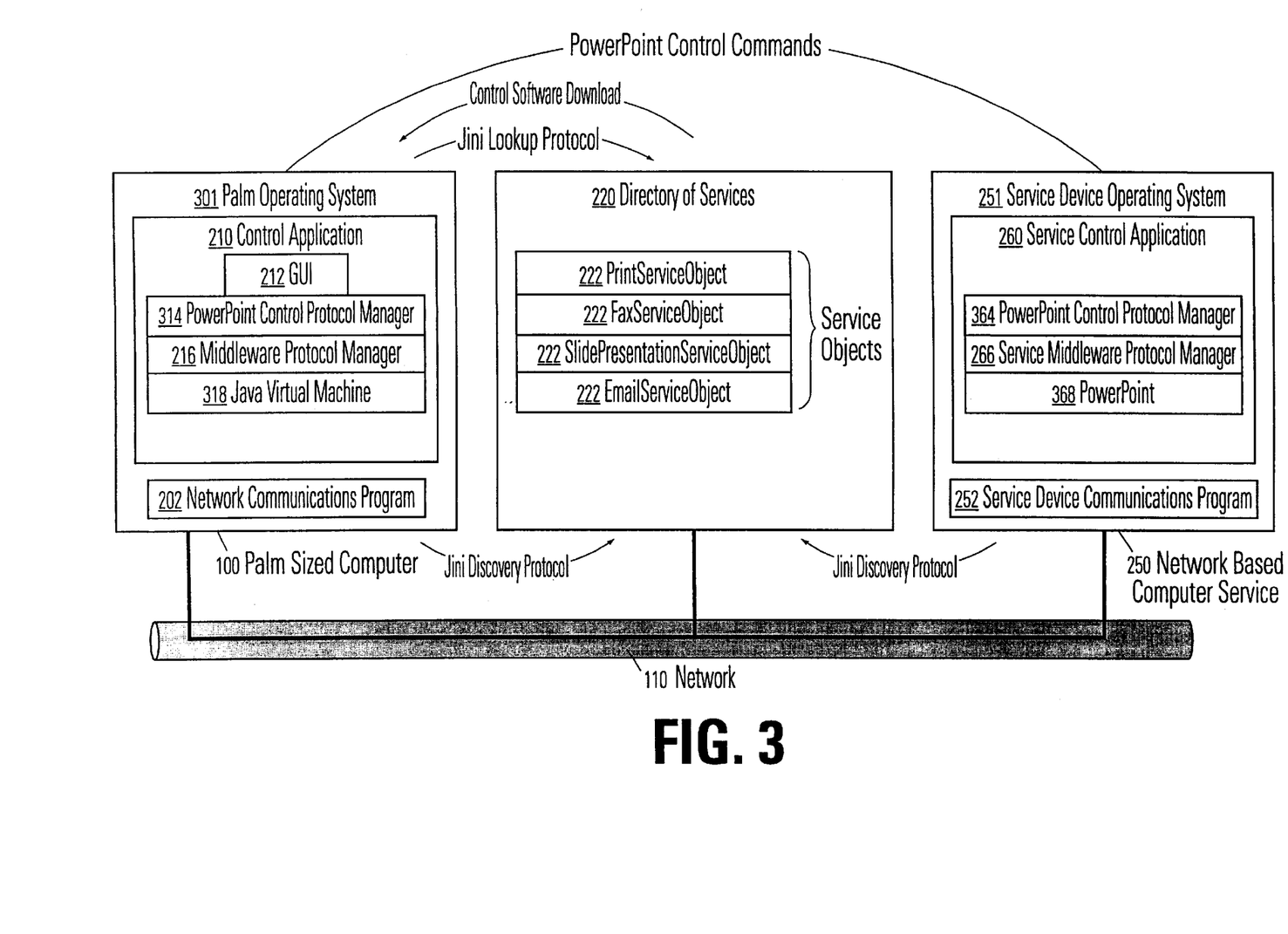
FIG. 3 illustrates an example architecture for controlling a PowerPoint presentation.

Returning to the specific example of the PowerPoint presentation, FIG. 3 illustrates the architecture that could be used to implement such a system. In FIG. 3, the control device 200 has been replaced with a palm sized computer 100 executing the Palm OS 301. The GUI 212 is specifically for PowerPoint control (see FIG. 1 for an example of such a GUI). The Java Virtual Machine 318 is executing on the palm sized computer 100 and replaces the middleware 218. The middleware protocol manager 216 supports Jini discovery, lookup and download protocols. PowerPoint control commands are issued to the network based computer service 250. The PowerPoint control protocol manager 364 provides the interface for these commands and controls the PowerPoint application 368.

F. Control Flow

The process for accessing and controlling network-based services is described below. The specific implementation control of a PowerPoint Service via a 3Com Palm Computing platform is used as an example. Refer to FIG. 1.

1. Configure a computer hosting the directory of services 220 and connect it to the network 110. For instance, a Jini lookup service is configured to listen at a preset TCP, or UDP, port for service registration or service lookup requests.
2. Establish a network connection from the network based computer service 250 to the network 110.
3. Register the computing service with a directory of services 220. For example, in the Jini model, the computing service initially sends out a multicast packet announcing its presence on the network. Once the directory service 220 receives the packet, it sends a unicast packet back to the announcer. The packet includes an interface (e.g. Java code) for uploading code back to the directory service 220 as well as for searching and downloading code from the directory service 220.
4. Upload service description to the directory service 220. If Jini is adopted as the middleware, the application service 130 receives the response from the directory service 220 and uses the included interface to upload its service interface to the directory service 220. When the service interface is called, it contacts the directory service 220 which in turn creates an entry (represented by an object) for this new service and sets the proper fields such as service name, attributes and optionally the corresponding service interface. Other middleware may choose to use protocol-based approaches such as FTP or TFTP for the uploading process.
5. Register the storage service 150 and display service 140 via the same process.
6. Establish a network connection from the control device 200 to the network 110. For Palm computers, there are multiple options for network connectivity. Possible solutions include using the infrared (IR) port to talk to a IR-LAN bridge or router, using the serial port to talk to a serial-to-LAN bridge or router, using either the IR or the serial port to talk to a digital cell phone and dial up a modem server, and/or using wireless data communications.
7. Launch the service control graphical user interface (GUI) 212 on the control device 200.
8. Via the service control GUI 212, accept user input, such as the selection of an application (for example, a PowerPoint application) to be controlled.
9. Optionally register the control device 200 with the directory service via a registration protocol, such as the Jini Discovery Protocol. This step is the same as the above one for the other services. It is executed only if the control device 200 has resources to offer.
10. Search the directory service 220 and download the desired service descriptor. In the case of Jini, after the control device 200 receives the response from the directory service 220, it uses the included interface to search the directory service 220 for an application service using the object type representing the service (such as an object type of PowerPoint presentation service) and the desired service attributes (such as the name and the physical location of the service). Once the directory service 220 finds such a service entry, the control device 200 is notified, which in turn uses the downloading interface to download the application service descriptor. One example of these services is the GUI code for controlling a PowerPoint presentation.
11. Send requests from the control device 200 to the network based computer service 250 to control the desired application. For example, a "next slide" request could be sent from a palm sized computer 100 to an application service 130 running PowerPoint. The communication can be based on a protocol such as the following one:

| Control Type | Application | File Name | Control Function |

Where:
Control Type={Request, Reply}
Application={PowerPoint, FAX, Print, Email, Phonebook, . . . }
File Name={3ComPalmVIISpecification}
Control function={File Load, Slide Forward, Slide Backward, File Close, . . . }

Alternatively, techniques such as Java's Remote Method Invocation (RMI) can be used to achieve the same goal. In this case, the control device makes a local function call such as doForwardSlide( ). The RMI mechanism will transfer the call to a remote machine which implements and carries out the function call. The PowerPoint presentation service may in turn use other services such as the storage service 150 and the display service 140. The procedure to employ these services is similar to steps 10–11 above.

12. Accept any response to requests sent from the control device 200 to the network based computer server 250 and process any errors.

G. Control Device GUI

An important element of the control application 210 is a GUI front-end which accepts user input for controlling the PowerPoint presentation (or other application) and a control protocol manager backend which takes user input and translates it into commands to the CPU service. An example GUI is depicted in FIG. 1. The example GUI allows the user to click on "forward", "backward", "go-to-first-page" or "go-to-last-page" buttons to control the slide show. The user can also click a "get-list" button to get a full list of the slide titles in the current presentation and choose to go to a particular slide. By clicking the "scribble" button, the window switches to graphics mode. In this mode, the user can draw at random on the panel, and the result of the drawing will be sent to the CPU service and eventually displayed on the projection service.

As explained in the software flow section, there are multiple ways to implement the application control protocol manager 214, the following illustrates one approach. The protocol takes the following form:

| Control Type | Application | File Name | Control Function |
| --- | --- | --- | --- |

Where:
  Control Type={Request, Reply}
  Application={PowerPoint, FAX, Print, Email, Phonebook, . . . }
  File Name={3ComPalmVIISpecification}
  Control function ={File Load, Slide Forward, Slide Backward, File Close,. . . . }

When the user clicks any button or draws something on the GUI, the application control protocol manager 214 generates the corresponding field in the protocol and sends a command to the network based computer service 250 via a TCP/IP channel.

H. Service Control Application Design

Figure 4:
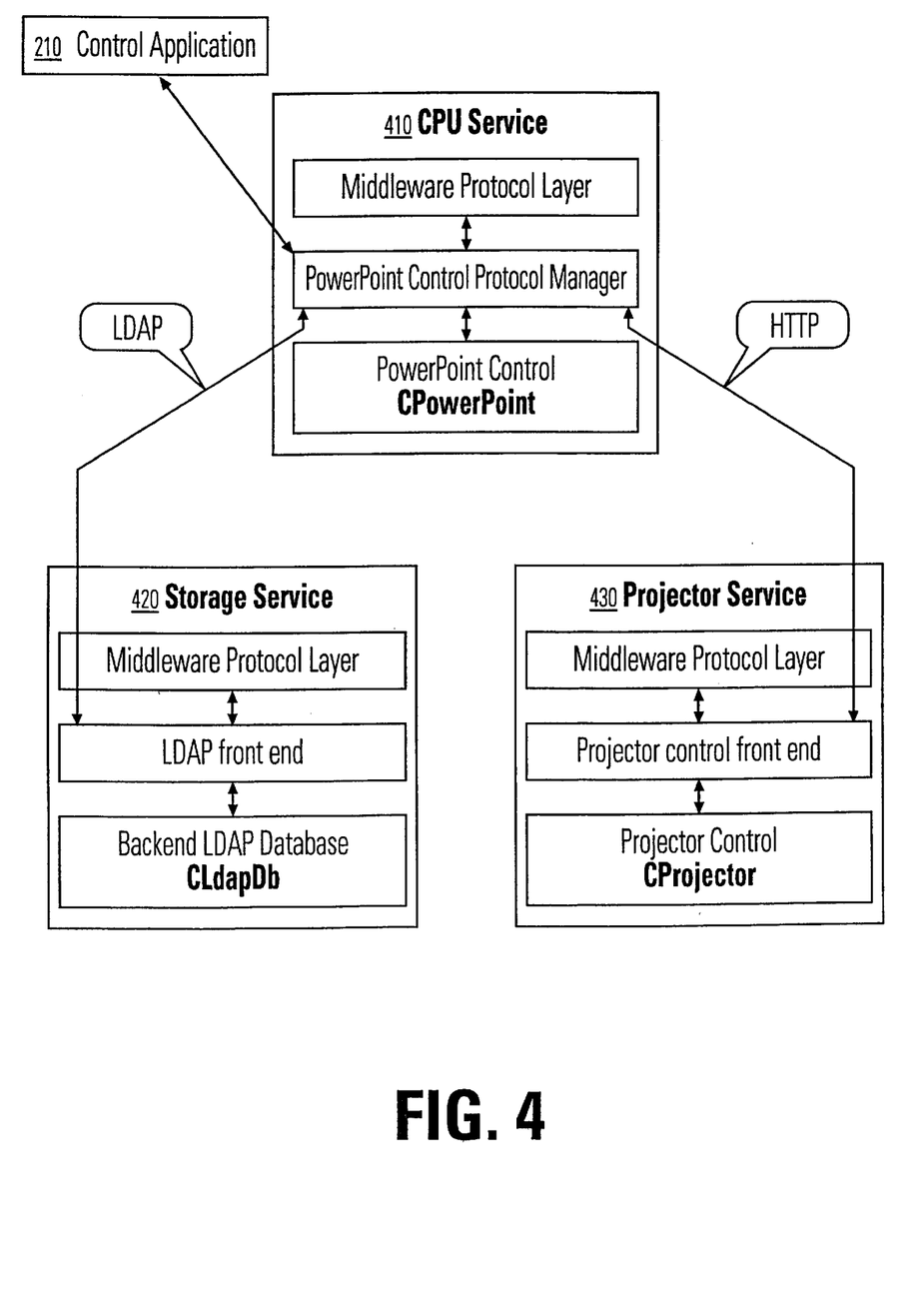
FIG. 4 illustrates a detailed software architecture for the example of FIG. 3.

FIG. 4 illustrates a detailed software architecture for the service control application of FIG. 3. The architecture includes three main elements: a CPU service 410 (corresponding to the application service 130), a storage service 420 (corresponding to the storage service 150) and a projector service 430 (corresponding to the display service 140). Each of the elements include middleware protocol layer management modules. Each module has a corresponding service application control module (e.g., PowerPoint Control Protocol Manager). To control specific network services, instances of those services are instantiated and are used by the corresponding control protocol manager. The following describes examples of such classes that can be instantiated for specific network services.

PowerPoint Control

The PowerPoint control, through OLE automation, instantiates and controls an instance of PowerPoint application. The PowerPoint control also communicates with the storage service 420 to store/retrieve presentations and the projector service 430 to view slides.

The PowerPoint control has the ability to have many presentations open at the same time and is capable of switching between presentations. A presentation has a collection of slides in it. Once open, the PowerPoint control allows easy traversal of the slides either by commands like previous, next slide or by direct access (e.g. slide number or slide title). When any change in slide position occurs, the PowerPoint application automatically generates the image that needs to be shown by the projector control and invokes the method on the projector control to show the changed slide.

Once a presentation is open, the PowerPoint control can have facilities such as Add Comments and Add Scribbled Graphics to the current slide. Additionally, it can allow the adding of new slides to the presentation.

Figure 5:
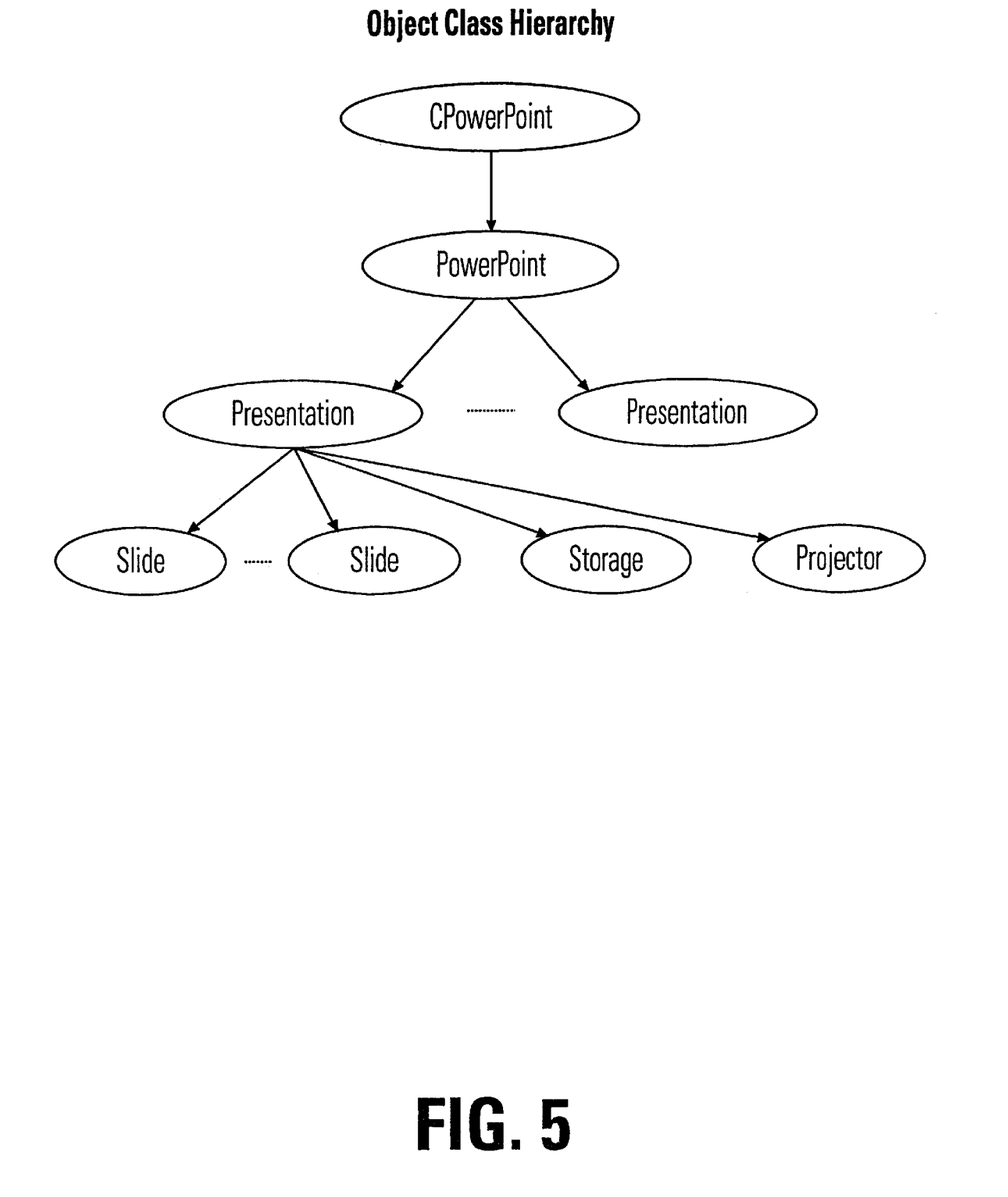
FIG. 5 illustrates a class hierarchy that can be used in the example of FIG. 3.

FIG. 5 illustrates an example object class hierarchy for the PowerPoint control class. The following describes the elements of FIG. 5 in more detail.

| Property/Method Name | Type | Description |
| --- | --- | --- |
| PowerPoint | | |
| Presentations | Collection Presentation | List of open presentations |
| Slides | Collection | Array of slides in presentation |
| Location | Storage | Location where presentation loaded from |
| View | Projector | Projector where presentation is viewed |
| Slide | | |
| Title | String | Title for the slide |
| AddComments | Method | Add given comments to slide at given coordinates |
| AddScribble | Method | Add given graphics to slide at given coordinates |
| Storage | | |
| Host | String | LDAP Server host where the presentation stored |
| FileName | String | File name and other details for presentation |
| Projector | | |
| Host | String | Projector host where slides shown |
| ShowSlide | Method | Show slide image on projector |

LDAP Database Control

The LDAP database control provides file system services to store and retrieve presentations. This control gets commands from the PowerPoint control through the LDAP protocol, to search for presentations and return presentations.

An object class hierarchy for CLdapDB could include CLdapDb having to a specific storage system reference.

| Property/Method Name | Type | Description |
| --- | --- | --- |
| Storage | | |
| FileFilter | String | File filter used to get file list |
| FileList | Collection | List of files found on storage |

Projector Control

The projector control provides image viewing services and has a simple image viewer that shows the image on a projection screen, monitor, display device or canvas. The control gets commands from the PowerPoint control. Specifically, to display images, the projector control could cause frames generated by the PowerPoint control to be displayed at the device controlled by the projector control. Other embodiments use more sophisticated techniques for displaying the PowerPoint information (e.g., support windowing system API calls that an application may make).

An object class hierarchy for CProjector could include CProjector having to a specific image view reference.

| ImageView | | |
|---|---|---|
| Property/Method Name | Type | Description |
| FileName | String | File name to be displayed |
| View | Method | Show the image on the projector |
| Mode | Long | FullScreen mode |

I. Directory of Services Design

The directory of services 220 encodes the set of services available on the network 110. The directory of services 220 describes the characteristics of these services and provides a means to locate those services. To illustrate this concept, an object-oriented directory service is used. The directory service will have objects whose attributes describe the features of available services and optionally include either code to invoke those services or a reference to such code. A directory service will typically be one of several components offered in the middleware a control device 200 will use.

Figure 6:
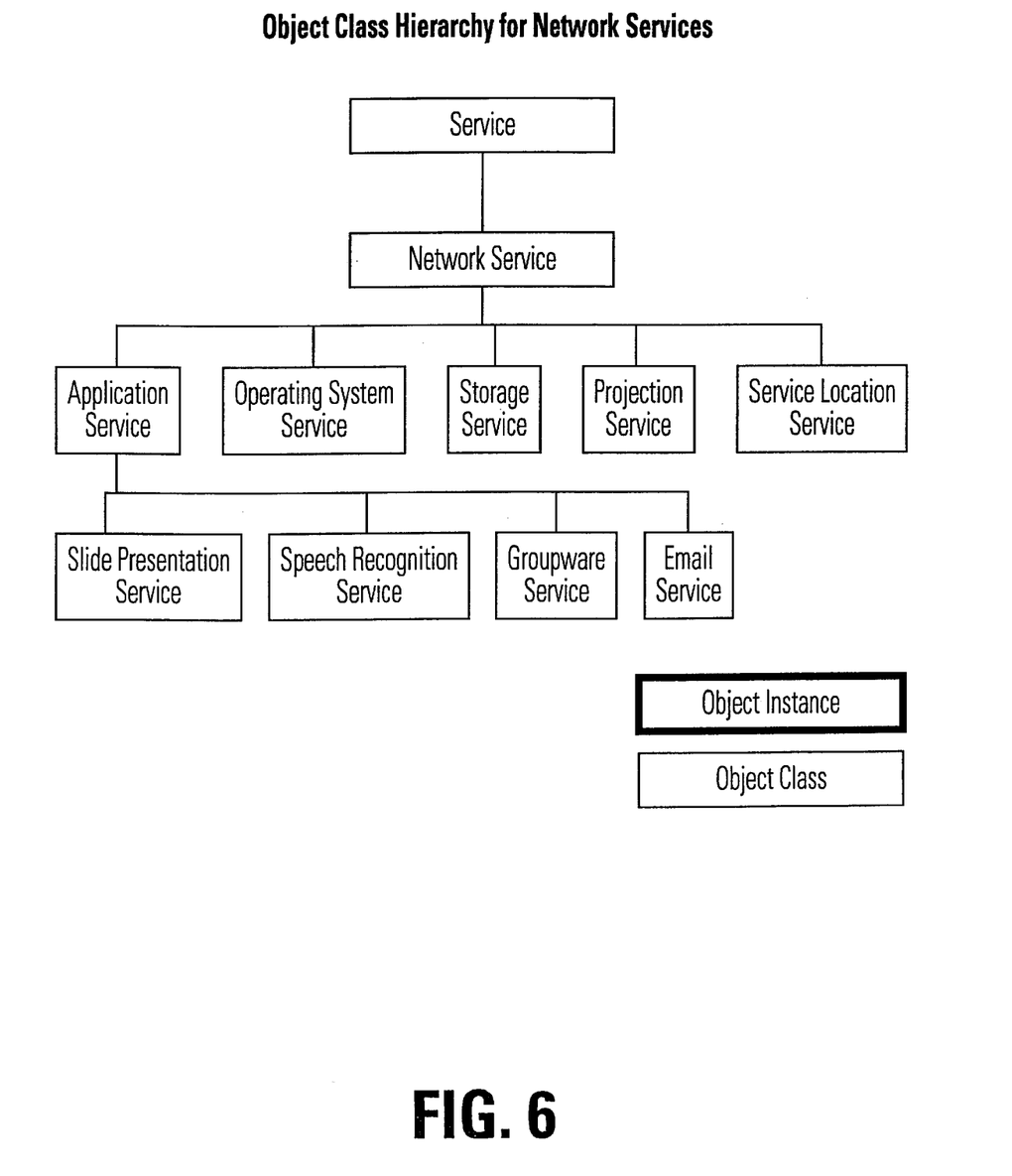
FIG. 6 illustrates an example class hierarchy for network services that can be provided in the system of FIG. 1.

FIG. 6 illustrates an object class hierarchy which models several network-based services. These network-based services are Application Service, Operating System Service, Storage Service, Projection Service, and Service Location Service. Examples of each of these services are now given.

Figure 7:
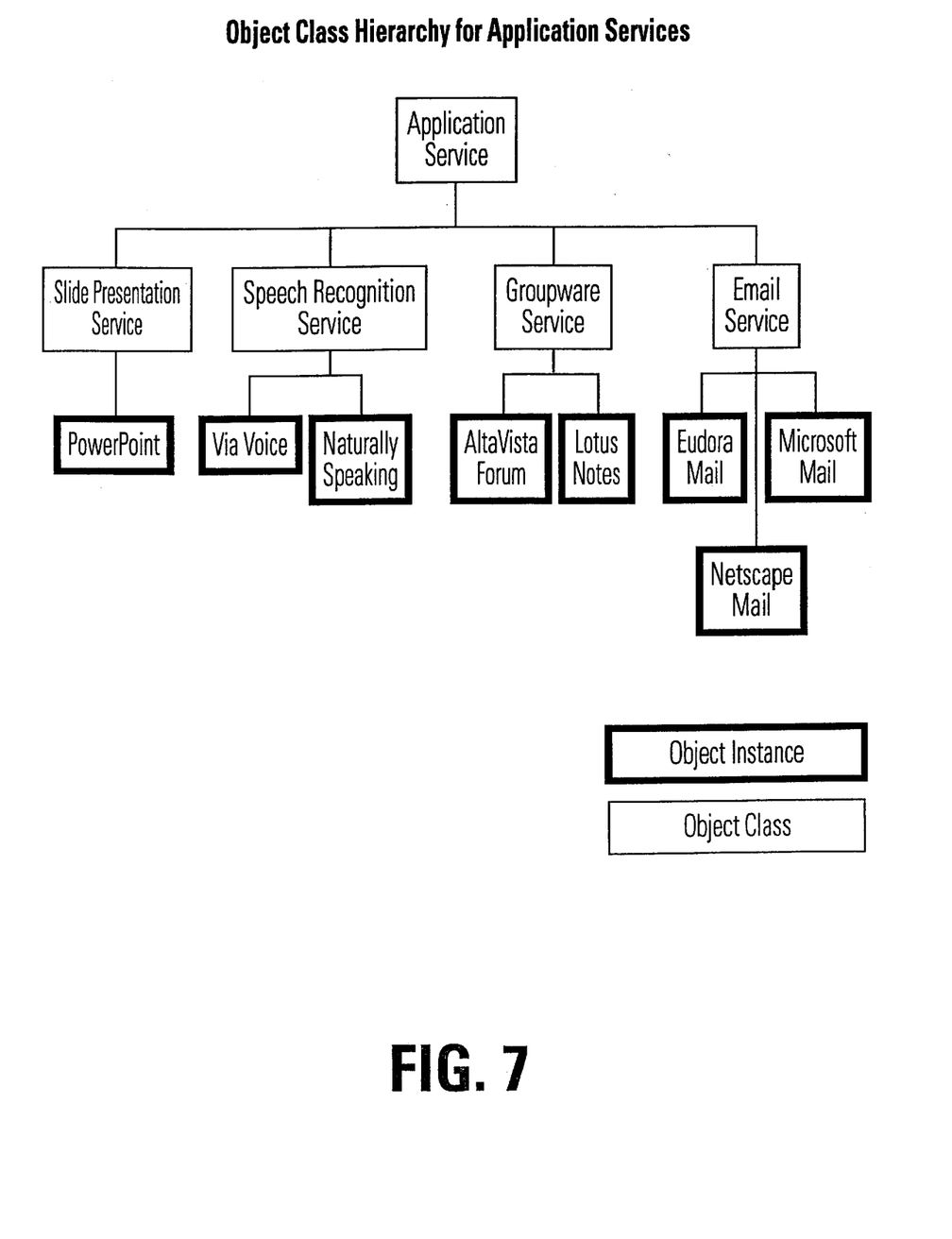
FIG. 7 illustrates an example class hierarchy for application services that can be provided in the system of FIG. 1.

Define-Class Service
   Superclass: root
   Attributes:
     Name
     Status
Define-Class NetworkService
   Superclass: Service
   Attributes:
     Location
     PhysicalAddress
     PhysicalMachine
     Owner
     Vendor
     Version
Define-Class ApplicationService
   Superclass: NetworkService
   Attributes:
     CodeLocation
     SerialNumber
     SupportedFeatures
Define-Class OperatingSystemService
   Superclass: NetworkService
   Attributes:
     RealTimeOS?
Define-Class StorageService
   Superclass: NetworkService
   Attributes:
     DatabaseType
     Schema
Define-Class ProjectionService
   Superclass: NetworkService
   Attributes:
     Resolution
Define-Class ServiceLocationService
   Superclass: NetworkService
   Attributes:
     QueryProtocol
     Schema FIG. 7 illustrates a partial object class hierarchy which models Application Services, including the PowerPoint Application Service:

Define-Class SlidePresentationService
   Superclass: ApplicationService
Define-Class GroupwareService
   Superclass: ApplicationService
Define-Class EmailService
   Superclass: ApplicationService
Define-Class SpeechRecognitionService
   Superclass: ApplicationService Based on this object class hierarchy, objects which represent network services can be defined. These objects are stored in a directory of services 220, such as a Jini Lookup.

An object to instantiate a SlidePresentationService could look as follows:

Make-Instance SlidePresentationService
   Name "PowerPoint"
   Status "Active"
   Location "3Com Intranet"
   PhysicalAddress "Building300.Floor2.Cube323"
   PhysicalMachine "PowerBook G3"
   Owner "Elaine Lusher"
   Vendor "Microsoft"
   Version "98"
   CodeLocation "system/applications/office/powerpoint:"
   SerialNumber "169-43-4666"
   SupportedFeatures "Scribble"

Other examples of objects which represent application services include:

Make-Instance SpeechRecognitionService
   Name "Naturally Speaking"
   Status "Active"
   Location "3Com Intranet"
   PhysicalAddress "Building300.Floor2.Cube100"
   PhysicalMachine "Solaris"
   Owner "Wenjun Luo"
   Vendor "Dragon Systems"
   Version "4.1"
   CodeLocation "system/applications/research/dragonspeech"
   SerialNumber "157-89-4323"
   SupportedFeatures "Dictation for Microsoft Word"
Make-Instance GroupwareService
   Name "Alta Vista Forum"
   Status "Active"
   Location "3Com Intranet"
   PhysicalAddress "Building300.Floor2.Cube220"
   PhysicalMachine "Windows NT"
   Owner "Paul Huard"
   Vendor "Microsoft"
   Version "3.1"
   CodeLocation "http://3Community/code/groupware/latest
   SerialNumber "444-56-7777"
   SupportedFeatures "Virtual Chat Room"
Make-Instance EmailService
   Name "Netscape Mail"
   Status "Active"
   Location "3Com Intranet"

PhysicalAddress "Building300.Floor2.Cube300"
PhysicalMachine "Solaris"
Owner "Rick Nottingham"
Vendor "Netscape"
Version "5.0"
CodeLocation "http://3Community/code/email/latest
SerialNumber "456-34-6786"

If middleware resides on a proxy device (rather than on the control device 200), the control device 200 will need to locate such a proxy service. An Operating System Service class can encode services such as a JVM Service, a Linux Service, or a Jini proxy.

Make-Instance OperatingSystemService
    Name "Jini Proxy"
    Status "Active"
    Location "3Com Intranet"
    PhysicalAddress "Building300.Floor2.Cube120"
    PhysicalMachine "Solaris"
    Owner "Rick Nottingham"
    Vendor "Sun"
    Version "5.0"
    RealTimeOS? "no"

Finally, directory services 220 (such as the Jini Lookup) are modeled. This could be encoded in a class such as the Service Location Service.

Make-Instance ServiceLocationService
    Name "Jini Lookup"
    Status "Active"
    Location "3Com Intranet"
    PhysicalAddress "Building300.Floor2.Cube150"
    PhysicalMachine "Solaris"
    Owner "Rick Nottingham"
    Vendor "Sun"
    Version "5.0"
    QueryProtocol "Jini Lookup Protocol"
    Schema "Service Directory Schema 1.0"

J. Variations on the Network-based Control Application

Several variations of the general control paradigm can be defined:

- The middleware (Jini, in our example) may not be physically resident on the control device 200. In this case, a proxy is used which runs middleware on behalf of the control device 200. Functionally speaking, the same design will still apply. One change to the design can be used to support a modified GUI for the control device. In these embodiments, the GUI program is modified by the proxy device to account for specific limitations of the control device. Also, in some embodiments, the control device may include preset applications that interface directly with the proxy device. Such an architecture would support a limited set of network services but would likely result in very small and lightweight applications on the control device.
- The control paradigm is not limited to palm sized computers. Any computing device with restricted computing power could be used as a control device 200 for any network-based resource. Switches, hubs, routers, and other networking devices are candidates for a control device 200. The network-based resources they use could include any service that cannot physically reside on the networking device due to restrictions such as limited memory.

Some embodiments of the invention include only the control device and the programs on the control device; other embodiments include some and/or all of the programs in computer readable media, or in electromagnetic waveforms.

K. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method of controlling a service on a network using a palm sized computer, the palm sized computer being coupled in communications with the network, the method comprising:
    accessing a description of the service from a directory of services, the description of the service including at least a reference to program code for controlling the service;
    downloading the program code to the palm sized computer;
    the palm sized computer executing at least a portion of the program code; and
    sending control commands to the service from the palm sized computer in response to the executing, wherein the service controls an application that cannot be executed on the palm sized computer.

2. The method of claim 1 further comprising registering the service in the directory of services by storing the description of the service in the directory of services.

3. The method of claim 1 wherein the directory of services includes a Jini Lookup directory, wherein the accessing the description includes executing a Jini discovery protocol to locate the Jini Lookup directory and executing a Jini Lookup protocol to retrieve the description of the service.

4. The method of claim 1 wherein the description of the service includes an object reference corresponding to an object representing the service and a set of service attributes including the name of the service and the physical location of the service.

5. The method of claim 1 wherein the program code includes Java code and wherein the palm sized computer is executing a Java Virtual Machine to execute at least a portion of the program code.

6. The method of claim 1 wherein the program code includes code to implement a graphical user interface on the palm sized computer.

7. The method of claim 1 wherein the application includes a desktop program.

8. A method of controlling a program on a network device from a palm sized computer, the computer is not capable of executing the program by itself, the network device and computer being coupled in communications via a network, the method comprising:
    accessing a directory of services, a service in the directory of services corresponding to the program, the description of the service including at least a reference to program code for controlling the service;
    loading the program code;
    issuing control commands to the network device using the program code, the control commands causing the network device to control the program.

9. The method of claim 8, wherein loading the program code includes loading the program code onto the palm sized computer and the issuing the control commands includes the palm sized computer issuing the control commands.

10. The method of claim 8, wherein a proxy device is coupled to the network and wherein accessing the directory of services includes the palm sized computer accessing the proxy device, and the proxy device accessing the directory of services, and wherein the loading the program code includes loading the program code onto the proxy device, and wherein the issuing the control commands includes the palm sized computer issuing a set of first set of commands to the proxy device and the proxy device issuing the control commands.

11. The method of claim 10, wherein the program code includes a user interface program and wherein the proxy device receives the user interface program and generates a second user interface for the palm sized computer.

12. The method of claim 8 wherein loading the program code includes loading the program code onto the palm sized computer from the directory of services.

13. The method of claim 8, wherein the palm sized computer includes a Palm OS compatible computer, wherein the program code includes Java code and wherein the directory of services includes a Jini directory of services.

14. The method of claim 8 further comprising the network device registering the description of the service with the directory of services.

15. The method of claim 8 wherein the program includes a desktop program.

16. The method of claim 8 wherein the program includes a desktop program and wherein the services controlled include a CPU service for executing the program, a storage service for providing data to the CPU service and a display service for displaying information generated from the CPU service.

17. A system for controlling a network service comprising:
- a network based computer service for controlling an application that cannot exectuted by a control device;
- a directory of services including a registry of services, each service in the registry of services corresponding to a service on the network;
- the control device having a program for sending control commands to the network based computer service, the program being loaded onto the control device as a result of locating a reference to the network based computer service in the directory of services;
- a network coupled in communications with the network based computer service, the directory of services and the control device;
- wherein the control device includes a palm sized computer having an operating system, a network communications program, a protocol program for communicating with the directory of services and wherein the program includes a graphical user interface.

18. The method of claim 17 wherein the network based computer service includes a computer having an operating system, a network communications program, a protocol program for communicating with the directory of services and the application.

19. A method for controlling a service in a network using a palm sized computer, the method comprising:
- accessing a description of a service, the description of the service including at least a reference to program code for controlling the service;
- downloading the program code;
- executing at least a portion of the program code; and
- sending control commands to the service in response to the executing, wherein the service includes a CPU service.

20. A system comprising:
- means for accessing a description of a service, the description of the service including at least a reference to program code for controlling a service;
- means for downloading the program code;
- means for executing at least a portion of the program code; and
- means for sending control commands to the service in response to the means for executing, wherein the service controls an application that cannot be executed on the means for executing.

* * * * *